US 6,564,131 B2

(12) United States Patent
Sebastian et al.

(10) Patent No.: US 6,564,131 B2
(45) Date of Patent: May 13, 2003

(54) FOUR-WHEEL STEERING ALGORITHM WITH FUNCTIONAL AND DIAGNOSTIC STATES AND MODES

(75) Inventors: Reeny T. Sebastian, Saginaw, MI (US); Scott M Wendling, Montrose, MI (US); Steven Klein, Munger, MI (US); Karen A Boswell, Freeland, MI (US); Steven J. Collier-Hallman, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/995,074

(22) Filed: Nov. 27, 2001

(65) Prior Publication Data

US 2003/0028303 A1 Feb. 6, 2003

Related U.S. Application Data

(60) Provisional application No. 60/309,434, filed on Aug. 1, 2001.

(51) Int. Cl.[7] .............................. B62D 5/04; B62D 5/00; H02P 7/00
(52) U.S. Cl. ............................ 701/41; 180/6.2; 180/6.5
(58) Field of Search ............................ 701/41; 180/6.2, 180/6.5, 6.6, 19.3, 233, 234, 400, 401; 280/47.11

(56) References Cited

U.S. PATENT DOCUMENTS

| | | | | |
|---|---|---|---|---|
| 4,687,216 A | * | 8/1987 | Kawamoto et al. | 180/409 |
| 4,695,068 A | * | 9/1987 | Kawamoto et al. | 180/409 |
| 4,914,592 A | * | 4/1990 | Callahan et al. | 180/415 |
| 5,048,633 A | * | 9/1991 | Takehara et al. | 180/197 |
| 5,189,616 A | * | 2/1993 | Tsurumiya et al. | 180/413 |
| 5,225,982 A | * | 7/1993 | Ito et al. | 123/361 |
| 5,253,172 A | * | 10/1993 | Ito et al. | 180/400 |
| 5,255,192 A | * | 10/1993 | Ito et al. | 180/197 |
| 5,276,624 A | * | 1/1994 | Ito et al. | 180/282 |
| 5,309,362 A | * | 5/1994 | Ito et al. | 180/197 |
| 5,346,030 A | * | 9/1994 | Ohmura et al. | 180/412 |
| 5,365,440 A | * | 11/1994 | Abe et al. | 180/408 |
| 5,417,299 A | * | 5/1995 | Pillar et al. | 180/24.01 |
| 5,607,028 A | * | 3/1997 | Braun et al. | 180/24.01 |
| 6,050,359 A | * | 4/2000 | Mouri et al. | 180/168 |
| 6,212,453 B1 | * | 4/2001 | Kawagoe et al. | 180/443 |
| 6,308,123 B1 | * | 10/2001 | Ikegaya et al. | 180/422 |
| 6,324,452 B1 | * | 11/2001 | Ikegaya | 180/422 |
| 6,338,015 B1 | * | 1/2002 | Kawagoe et al. | 180/167 |

* cited by examiner

Primary Examiner—William A Cuchlinski, Jr.
Assistant Examiner—Olga Hernandez
(74) Attorney, Agent, or Firm—Edmund P. Anderson

(57) ABSTRACT

A method for controlling a four-wheel steering system of a vehicle includes recognizing a driver-selectable mode, receiving a signal preferably indicative of a front wheel steering-angle, and determining a rear-to-front steering-angle ratio in correspondence with the recognized mode and the received signal; and optionally includes receiving a signal indicative of vehicle speed, recognizing a current system state, determining a desired steering-angle, generating a command based on the desired and received steering-angles and the recognized system state, and diagnosing conditions in accordance with the received signals in order to enter a output disable mode.

16 Claims, 4 Drawing Sheets

| Symbol | Description |
|---|---|
| E | Vehicle Engine signal is ON |
| E* | Vehicle Engine signal is OFF |
| I | Vehicle Ignition is ON |
| I* | Vehicle Ignition is OFF |
| A | Alternator Indicator Light ON |
| A* | Alternator Indicator Light OFF |
| Z | Zero Rear Wheel Angle has been reached |
| Z* | Zero Rear Wheel Angle ramp executing |
| F* | No Fault |
| F1 | Fault Requiring IMMEDIATE SHUTDOWN |
| F2 | Ramp to Zero Rear Wheel angle and SHUTDOWN |
| F3 | Ramp to Zero Rear Wheel angle and HOLD AT ZERO |
| F4 | Fault Requiring OPERATOR NOTIFICATION |

FIG. 4

FOUR-WHEEL STEERING ALGORITHM WITH FUNCTIONAL AND DIAGNOSTIC STATES AND MODES

CROSS-REFERENCE TO RELATED APPLICATIONS

This application claims the benefit of U.S. provisional application No. 60/309,434, filed Aug. 1, 2001, the contents of which are incorporated by reference herein in their entirety.

BACKGROUND

In vehicular applications, a typical four-wheel steering system steers the front and the rear wheels of a vehicle. More specifically, a rear wheel steering porition of the system may produce a desired rear wheel steering angle to improve directional stability at high speeds and maneuverability at low speeds. The high-speed steering method may reduce vehicle yaw by steering the, front and rear wheels in the same general direction, and thereby improve vehicle stability. The low speed steering method may achieve tight turning radii at low speeds by steering the front and rear wheels in different directions to thereby reduce the effective turning radius of the vehicle.

Use of a vehicle for the towing of a trailer, for example, may affect the optimal ratios between the front and rear wheel steering angles. For vehicles that are frequently used for towing, such as some trucks, for example, it may be desirable to provide a driver-selectable steering mode that retains the many benefits of four-wheel steering while compensating for the presence of a trailer.

SUMMARY

The above described and other features are exemplified by the following Figures and Description in which a method for controlling a four-wheel steering system of a vehicle is disclosed that includes recognizing a driver-selectable mode, receiving a signal preferably indicative of a front wheel steering-angle, and determining a rear-to-front steering-angle ratio in correspondence with the recognized mode and the received signal; and optionally includes receiving a signal indicative of vehicle speed, recognizing a current system state, determining a desired steering-angle, generating a command based on the desired and received steering-angles and the recognized system state, and diagnosing conditions in accordance with the received signals in order to enter an output disabled mode.

BRIEF DESCRIPTION OF THE DRAWINGS

Exemplary embodiments will now be described by way of example with reference to the accompanying drawings wherein like reference numerals designate like features in the several figures, in which:

FIG. 4 is a symbol description table for the state-transition diagram of FIG. 3.

DETAILED DESCRIPTION OF PREFERRED EMBODIMENTS

Figure 1:
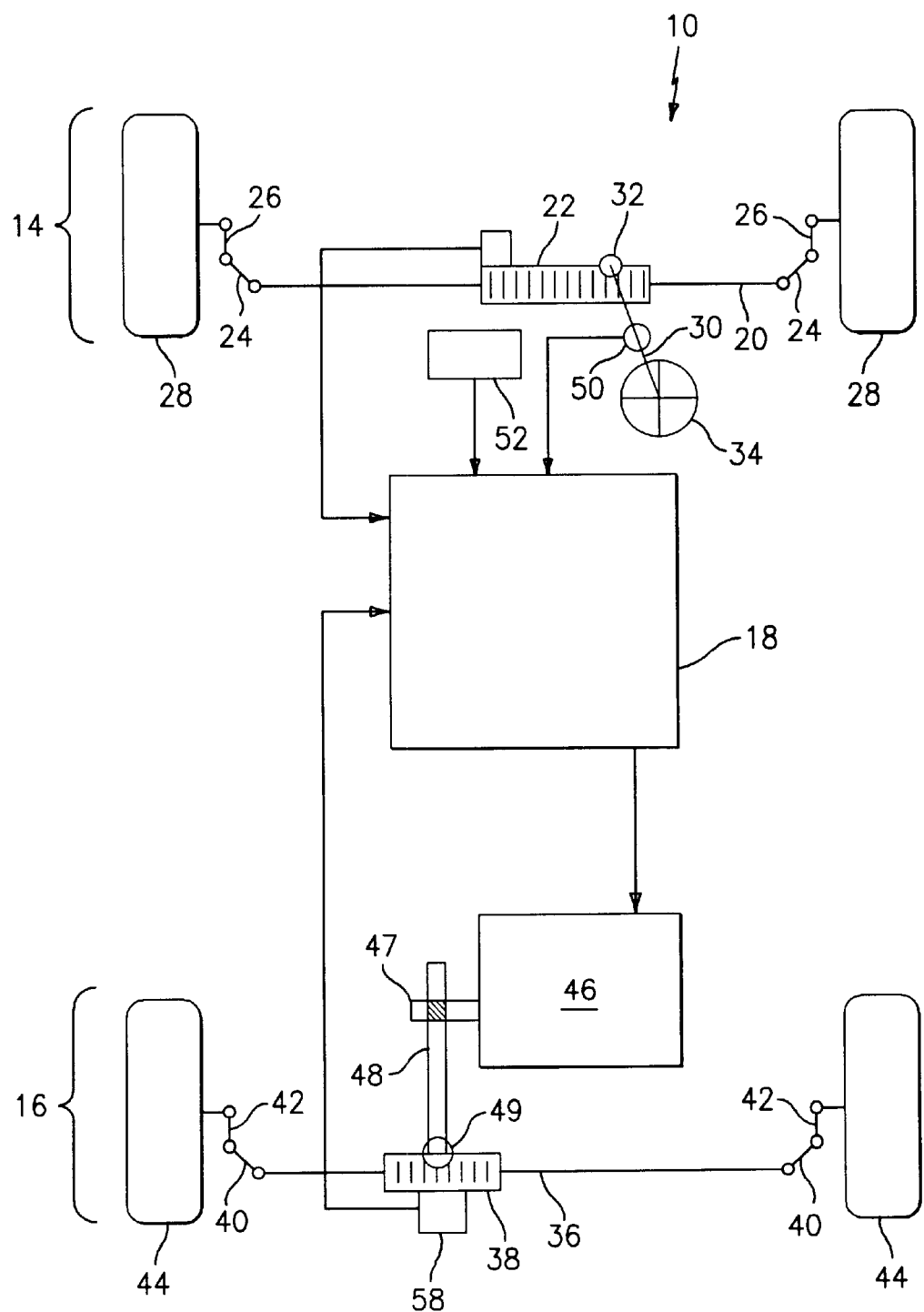
FIG. 1 is a schematic diagram of a vehicular four-wheel steering system having a controller.

As shown in FIG. 1, a vehicular four-wheel steering system is indicated generally by the reference numeral 10. The system 10 includes a controller 18 coupled to sensors and interfaces for performing a variety of processes prescribed by the desired controlling functions.

The system 10 is incorporable into a vehicle to provide enhanced steering and directional control of the vehicle. The system 10 comprises a front steering mechanism, shown generally at 14, a rear steering mechanism, shown generally at 16, and a controller 18 in signal communication with the front steering mechanism 14 and the rear steering mechanism 16. Although the system 10 is described as being applicable to a rack and pinion steering arrangement, the system 10 is adaptable to other steering arrangements including, for example, integral gear steering systems.

The front steering mechanism 14 comprises a rack shaft 20, a rack 22 disposed intermediately between opposing ends of the rack shaft 20, a tie rod 24 disposed on each opposing end of the rack shaft 20, a knuckle arm 26 connected to each tie rod 24, and a front steerable wheel 28 rotatably disposed on each knuckle arm 26. The rack shaft 20, tie rods 24, and knuckle arms 26 are configured such that the front steerable wheels 28 can pivot in unison relative to the vehicle to steer or to effect a change in the direction of travel while the vehicle is moving.

The front steering mechanism 14 further comprises a mechanism through which a vehicle operator can effectuate a desired change in the direction of travel of the vehicle. Such a mechanism comprises a steering column 30 disposed in operable communication at one end with the rack 22 through a pinion 32 and at an opposing end thereof with a steering device 34. The steering device 34 may be a hand steering wheel, or "hand-wheel". Manipulation of the steering device 34, i.e., rotation of the hand-wheel, causes the axial rotation of the steering column 30, which in turn causes the rotation of the pinion 32. Rotation of the pinion 32, through the engagement of the rack 22 and the pinion 32, effectuates the lateral translation of the rack 22 relative to the vehicle. The lateral translation of the rack 22 causes the front steerable wheels 28 to angle relative to the vehicle, thereby altering the direction of travel while the vehicle is moving.

The rear steering mechanism 16 comprises a rack shaft 36, a rack 38 disposed intermediately between opposing ends of the rack shaft 36, tie rods 40 disposed on each opposing end of the rack shaft 36, a knuckle arm 42 connected to each tie rod 40, and a rear steerable wheel 44 rotatably disposed on each knuckle arm 42. The rack shaft 36, tie rods 40, and knuckle arms 42 are configured such that the rear steerable wheels 44, like the front steerable wheels 28, can be pivoted in unison relative to the vehicle to steer the vehicle upon lateral translation of the rack 38.

The rear steering mechanism 16 further comprises a mechanism through which the rear steerable wheels 44 can similarly be pivoted. Such a mechanism comprises an actuating motor 46 operably connected to the rack 38 through a drive mechanism 48. The drive mechanism 48, through a pinion 49, transfers the rotational motion of a rotor shaft 47 of the motor 46 to linear motion of the rack 38, which effectuates the lateral motion of the rack shaft 36 and, ultimately, the pivoting of the rear steerable wheels 44.

The vehicle is further provided with a steering sensor 50 for detecting an angular position of the steering column 30, a vehicle speed sensor 52, and a rear rack shaft displacement sensor 58. The rear rack shaft displacement sensor 58 detects the displacement of its corresponding rack shaft 36 from a reference position, which is the position in which each rear steerable wheel 44 is aligned and rotatable.

The controller 18 is disposed in signal communication with the various systems of the vehicle. The controller 18 receives informational signals from the vehicular systems, quantifies the received information, and provides an output command signal in response thereto, such as in this instance, for example, to the rear steering mechanism 16 through the motor 46.

In order to perform the prescribed functions and desired processing, as well as the computations therefore (e.g., the execution of the rear wheel steering algorithms, and the like), the controller 18 may include, but need not be limited to, processors, computers, memory, storage, registers, timing devices, interrupts, communication interfaces, input/output signal interfaces, and the like, as well as combinations comprising at least one of the foregoing. For example, the controller 18 may include input signal filtering to enable accurate sampling and conversion or acquisition of such signals from communications interfaces.

Figure 2:
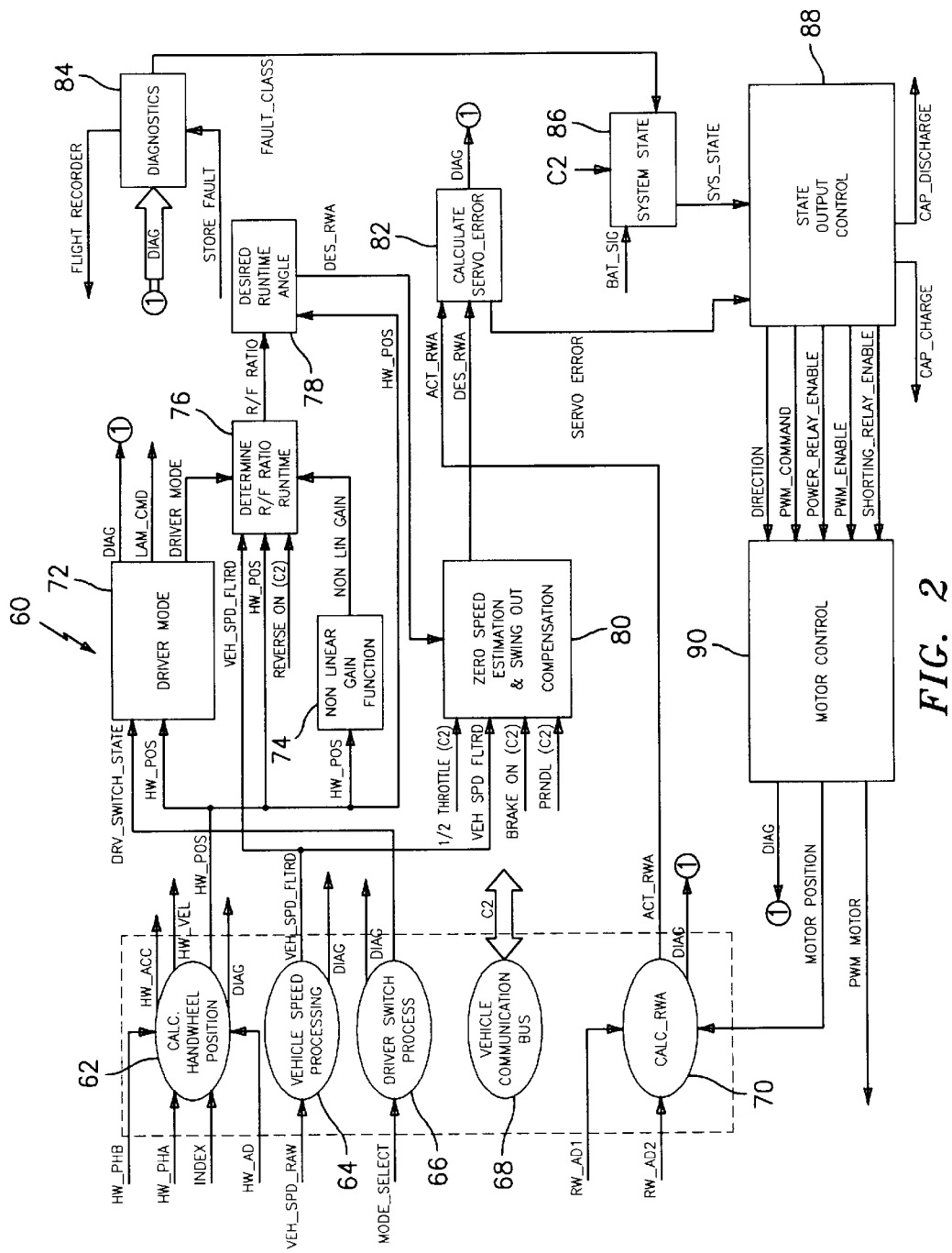
FIG. 2 is a signal flow diagram for the controller of FIG. 1.

Turning to FIG. 2, a four-wheel steering algorithm for the controller 18 of FIG. 1 is indicated generally by the reference numeral 60. In the algorithm 60, a Hand-wheel Position Calculation function 62 receives signals indicative of instantaneous hand-wheel position, and produces signals indicative of hand-wheel acceleration, hand-wheel velocity, hand-wheel position, and diagnostics. A Vehicle Speed function 64 receives a signal indicative of raw vehicle speed and produces signals indicative of a filtered vehicle speed and diagnostics. A Driver Switch function 66 receives a signal indicative of a driver-selectable mode and produces signals indicative of the state of the driver's switch and diagnostics. A communication function 68 receives signals indicative of Vehicle Communication bus information, which is generally available information from other vehicular sensors and processes, and extracts the signals indicative of throttle percentage, vehicle speed, brake application, transmission mode, selected gear, and diagnostics.

A Rear Wheel Steering Angle function 70 receives raw signals indicative of rear wheel steering angle and produces signals indicative of actual rear wheel steering angle and diagnostics. A Driver Mode function 72 receives the signal indicative of the state of the driver's switch from the Driver Switch function 66, receives the signal indicative of hand-wheel position from the Hand-wheel Position Calculation function 62, and produces signals indicative of lamp command, Driver Mode, and diagnostics. A Gain function 74 receives the signal indicative of hand-wheel position from the Hand-wheel Position Calculation function 62 and produces a gain signal as input to a Rear to Front Ratio function 76. The Rear/Front Ratio function 76 also receives the signal indicative of Driver Mode from the Driver Mode function 72, the signal indicative of hand-wheel position from the Hand-wheel Position Calculation function 62, the signal indicative of the filtered vehicle speed from the Vehicle Speed function 64, a signal indicative of gear selection from the Vehicle Communication function 68, and produces a signal indicative of the desired rear to front steering angle ratio for input to a Runtime Angle function 78.

The Runtime Angle function 78 also receives the signal indicative of hand-wheel position from the Hand-wheel Position Calculation function 62, and produces a signal indicative of a desired rear wheel steering angle for input to a Zero Speed Estimation & Swing Out Compensation Algorithm 80. The Zero Speed Estimation & Swing Out Compensation Algorithm 80 also receives the signal indicative of the filtered vehicle speed from the Vehicle Speed function 64; as well as the signals indicative of throttle percentage, brake application, and transmission mode from the Vehicle Communication function 68. The Zero Speed Estimation & Swing Out Compensation Algorithm 80 limits the desired rear wheel steering angle based on the vehicle status for input to a Servo-Error function 82. The Servo-Error function 82 also receives the signal indicative of the actual rear wheel steering angle from the Rear Wheel Steering Angle function 70, and produces signals indicative of a servo error and diagnostics.

A Diagnostics function 84 receives the signals indicative of diagnostics from the functions in the four-wheel steering algorithm 60, such as the Rear Wheel Steering Angle function 70, Hand-wheel Position Calculation function 62, Vehicle speed processing function 64, Driver switch process function 66, Vehicle Communication function 68, the Driver Mode function 72, the Servo-Error function 82, and a Motor Control function 90, and produces signals indicative of vehicle recorder data, storable fault codes, and class of fault.

A System State function 86 receives the signal indicative of class of fault, a signal indicative of a battery signal, the signals produced by the Class 2 function 68, and produces a signal indicative of a system state for input to a State Output Control function 88. The State Output Control function 88 also receives the signal indicative of the servo error from the Servo-Error function 82, and produces signals indicative of direction, pulse-width-modulation command, power relay enable, pulse-width-modulation enable, shorting relay enable, capacitor charging, and capacitor discharging. The Motor Control function 90 receives the signals indicative of direction, pulse-width-modulation command, power relay enable, pulse-width-modulation enable, and shorting relay enable from the State Output Control function 88, and produces a signal indicative of motor position for input to the Rear Wheel Steering Angle function 70, a signal indicative of diagnostics for input to the Diagnostics function 84, and a signal indicative of the pulse-width-modulated command for the motor 46 of FIG. 1.

Figure 3:
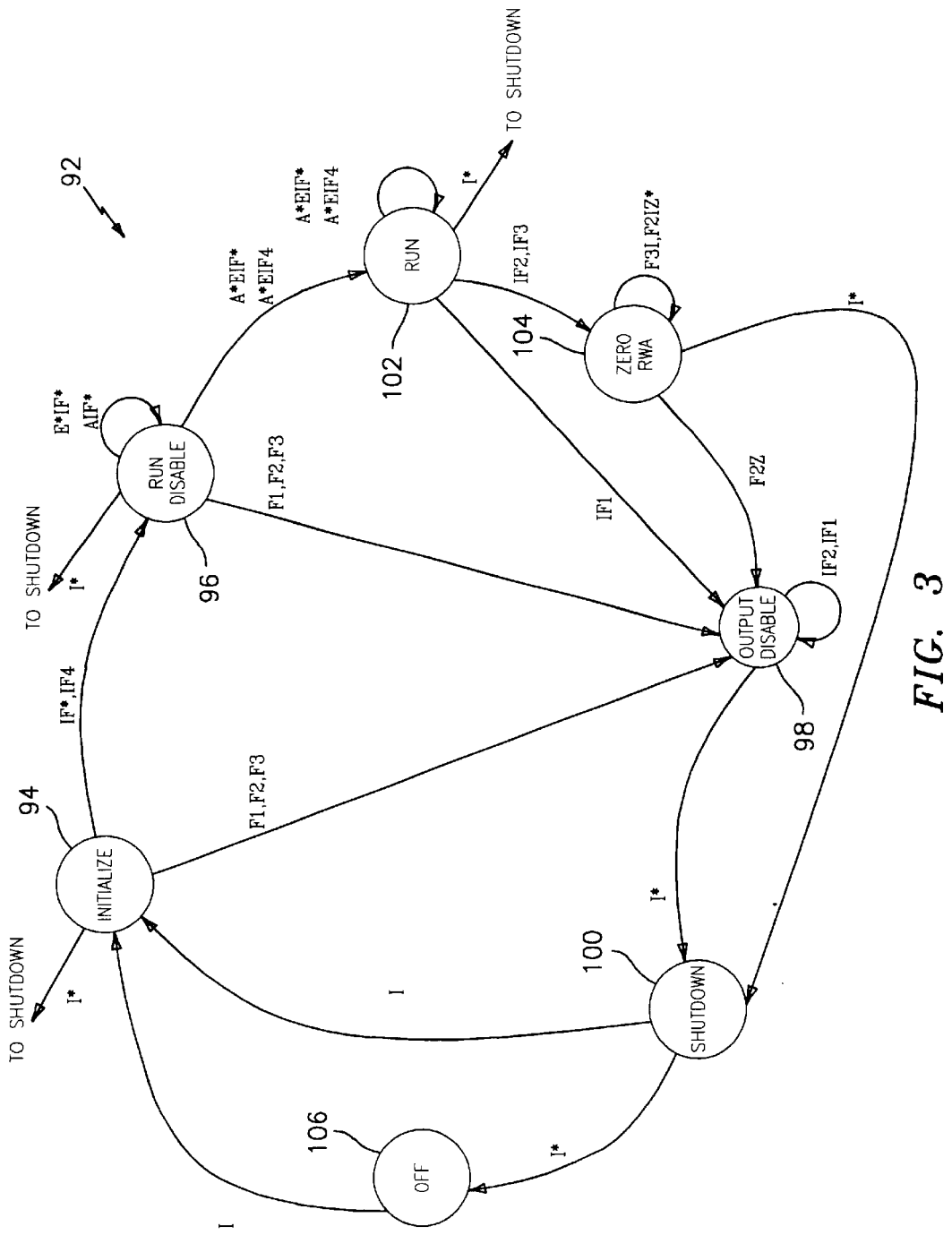
FIG. 3 is a state-transition diagram for the controller of FIGS. 1 and 2.

Referring now to FIGS. 3 and 4, the System State function 86 of the four-wheel steering algorithm 60 of FIG. 2 has a state-transition diagram indicated generally by the reference numeral 92 of FIG. 3, with logical condition flags as listed in the table 108 of FIG. 4. The state-transition diagram 92 includes an Initialize state 94 from which the controller 18 of FIG. 1 may transition to a Run Disable state 96 if the conditions {(I and F*) or (I and F4)} are met, an Output Disable state 98 if {F1 or F2 or F3}, or a Shutdown state 100 if {I*}. From the Run Disable state 96, the controller 18 may transition to a Run state 102 if {(A* and E and I and and F*) or (A* and E and I and and F4)}, the Output Disable state 98 if {F1 or F2 or F3}, the Shutdown state 100 if {I*}, or remain in the Run Disable state 96 if {(E* and I and F*) or (A and I and F*)}.

From the Run state 102, the controller 18 may transition to a Zero RWA state 104 if the conditions {(I and F2) or (I and F3)} are met, the Output Disable state 98 if {I and F1}, the Shutdown state 100 if {I*}, or remain in the Run State 102 if {(A* and E and I and F*) or or (A* and E and I and and F4)}. From the Zero RWA state 104, the controller 18 may transition to the Output Disable state 98 if {F2 and Z}, the Shutdown state 100 if {I*}, or remain in the Zero RWA state 104 if {(F3 and I) or (F2 and I and Z*)}. From the Output Disable state 98, the controller 18 may transition to the Shutdown state 100 if {I*}, or remain in the Output Disable state 98 if {(I and F2) or (I and F1)}. From the Shutdown state 100, the controller 18 may transition to the Initialize state 94 if {I}, or to an Off state 106 if {I*}. From the Off state 106, the controller 18 may transition to the Initialize state 94 if {I}.

In operation, the four-wheel steering algorithm 60 of FIG. 2 controls rear wheel steer to enhance the low speed manuverability and the high speed stability of a vehicle. The four-wheel steering algorithm 60 uses the motor 46 of FIG. 1 to drive the rack 38 and pinion 49 rear wheel portion of the four-wheel steering system 10 of FIG. 1, which produces a desired rear wheel angle to improve the high speed directional stability and low speed turning ability of a vehicle. This disclosure provides features that may be used in automobiles, and that may be particularly desirable in trucks used for towing.

The four-wheel steering algorithm 60, in general, provides an out-of-phase rear wheel steering angle at low speed to reduce the turning radius of a vehicle and an in-phase steering angle at high-speed to enhance stability. The desired rear wheel steering angle is a function of vehicle speed and hand-wheel angle. As introduced with reference to FIG. 2, the driver can select a desired mode of operation such as, for example, normal four-wheel steering and trailer modes, respectively. The selected driver mode will determine the desired rear-to-front ratio function 76 for optimum operation, which function may be implemented as a look-up table as known to those of ordinary skill in the pertinent art. The gain table function 74, which may be non-linear, generally improves the on-center response of the four-wheel steering system 10.

The Zero Speed Estimation & Swing Out Compensation Algorithm 80 of FIG. 2 determines whether the rear wheel angle will be limited based on various vehicular inputs, such as, for example, signals indicative of transmission mode or "PRNDL", throttle percentage, vehicle speed, and brake application. The limited desired rear-wheel-angle signal represents the variable compared against the actual rear-wheel-angle signal, which is based on motor position, to compute the servo error. Depending on the state that the system is in as shown in FIG. 3, the desired command to the motor is determined. If the controller is not in any diagnostic state, the servo-error command is used to determine a system gain, and hence, in this exemplary embodiment, a pulse-width-modulated ("PWM") command to the motor 46 of FIG. 1.

The state transition diagram 92 as shown in FIG. 3 may be implemented in software to control the operational state of the system 10. Thus, the Off state 106 of FIG. 3 is the state in which the ignition is turned off and the controller 18 powers down all functions. The Off state 106 consumes as little power as possible and remains in this state until a valid ignition signal is received by the controller 18. The Initialize state 94 performs all initialization functions for a typical start up process. Some of these functions are input and output ("I/O") diagnostics, memory tests, variable initialization, and other standard tests as known to those of ordinary skill in the pertinent art. After completion of these tasks, the controller 18 will remain in the Run Disable state 96 until a valid state-transition is achieved. The Run Disable state 96 activates all outputs and processes all inputs, but the voltage command to the motor 46 remains at zero. In this Run Disable state 96, the rear wheels will not steer under any circumstances. Having all output devices, such as, for example, field-effect transistors ("FETS"), remain open in this state is one way to ensure that no output to the motor 46 will occur in this state 96.

In the Run state 102, the rear-wheel steering angle is a function of hand-wheel position, vehicle speed, and the driver-selectable operating mode. The system 10 will ramp to the desired rear wheel steering angle so that the transition is generally undetected by the driver. The Run state 102 is the full operational state in which the system 10 normally operates. Full diagnostic and motor control function is enabled in this state 102.

The Output Disable state 98 is the state the controller 18 reaches once a rapid shutdown or F1 fault is detected by the diagnostic algorithms. In this state 98, all outputs to the motor 46 are deactivated. The only way to leave the Output Disable state 98 is to cycle the ignition off-to-on. The specific actions in this state include that the output command to the motor is zeroed, the motor drive circuits are disabled, the commands to open the power relay and close the motor relay are issued no later than 4 msec of zeroing the output command, the fault lamp is commanded on, the appropriate fault code information is stored, the algorithms that calculate the output command are not executed, and the serial communications used to report fault information and some Vehicle Communication bus information are supported. The Shutdown state 100 performs all shutdown tasks and deactivates the system. For an F2 fault or the controlled shutdown condition, the controller ramps the RWA to zero in state 104 and enters the Output Disable state 98 as described above.

The Zero RWA (rear wheel steering angle) state 104 is the state the controller 18 reaches once a F3 type condition is detected by the diagnostic algorithms that are executed by the software. In the case of an F3 fault, the controller will ramp the rear wheel steering angle ("RWA") to zero and hold the rear wheels at zero RWA. For a Ramp to Zero and Hold, specific actions include that the output command to the motor is linearly ramped down to zero at a rate of 2 deg/sec, for example; that the command to the motor is continuously changed to maintain a substantially zero servo error command; that the fault lamp is commanded on; and that the appropriate fault code information is stored.

The above-described methodology provides a method for controlling a four-wheel steering system, thereby improving driver control of a vehicle. In addition, the present teachings may be embodied in the form of computer-implemented processes and apparatuses for practicing those processes. The present teachings can also be embodied in the form of computer program code containing instructions embodied in tangible media, such as floppy diskettes, CD-ROMs, hard drives, or any other computer-readable storage media, wherein, when the computer program code is loaded into and executed by a computer, the computer becomes an apparatus for practicing the teachings of the present disclosure.

The teachings of the present disclosure can also be embodied in the form of computer program code, for example, whether stored in a storage medium, loaded into and/or executed by a computer, or as data signal transmitted, whether by a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the teachings herein. When implemented on a general-purpose microprocessor, the computer program code segments configure the microprocessor to create specific logic circuits.

While the disclosure has been made with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method for controlling a four-wheel steering system of a vehicle, the method comprising:
   recognizing a driver-selectable mode;
   receiving a signal indicative of at least one of the front wheel steering angle and the rear wheel steering angle;
   determining a rear-to-front steering-angle ratio in correspondence with at least or e of the recognized mode and the received signal;
   receiving a signal indicative of vehicle speed;
   recognizing a current system state;
   determining a desired steering-angle;
   generating a command in accordance with the determined desired steering-angle, the received signal indicative of steering angle, and the recognized system state; and
   diagnosing conditions in accordance with at least one of the received signals in one to enter an output disable mode.

2. A method for controlling a four-wheel steering system of a vehicle, the method comprising:
   recognizing a driver-selectable mode;
   receiving a signal indicative of at least one of the front wheel steering angle and the rear wheel steering angle;
   determining a rear-to-front steering-angle ratio in correspondence with at least one of the recognized mode and the received signal; receiving a signal indicative of the front wheel steering angle; and
   determining a rear steering angle in correspondence with the recognized mode and the received signal indicative of the front wheel steering angle.

3. A method for controlling a four-wheel steering system of a vehicle, the method comprising:
   recognizing a driver-selectable mode;
   receiving a signal indicative of at least one of the front wheel steering angle and the rear wheel steering angle;
   determining a rear-to-front steering-angle ratio in correspondence with at least one of the recognized mode and the received signal; and
   recognizing a driver-selectable mode corresponding to one of a standard four-wheel steering mode and a trailer-towing four-wheel steering mode.

4. A method as defined in claim 3, further comprising:
   a gain function for enhancing the on-center feel of the four-wheel steering system.

5. A method as defined in claim 4 wherein the gain function is non-linear.

6. A method as defined in claim 3, further comprising:
   commanding a motor in correspondence with the determined rear-to-front steering-angle ratio for controlling the rear-wheel steering angle of said vehicle.

7. A method as defined in claim 6, said commanding comprising providing a pulse-width-modulated signal to the motor.

8. A method for controlling a four-wheel steering system of a vehicle, the method comprising:
   recognizing a driver-selectable mode;
   receiving a signal indicative of at least one of the front wheel steering angle and the rear wheel steering angle;
   determining a rear-to-front steering-angle ratio in correspondence with at least one of the recognized mode and the received; and
   a driver switch function for receiving a signal indicative of a selected mode and providing a signal indicative of a driver switch state.

9. A method for controlling a four-wheel steering system of a vehicle, the method comprising:
   recognizing a driver-selectable mode;
   receiving a signal indicative of at least one of the front wheel steering angle and the rear wheel steering angle;
   determining a rear-to-front steering-angle ratio in correspondence with at least or e of the recognized mode and the received signal; and
   a driver mode function for receiving a signal indicative of a driver switch state and a signal indicative of a hand-wheel position, and providing a signal indicative of a driver-selected mode.

10. A method for controlling a four-wheel steering system of a vehicle, the method comprising:
    recognizing a driver-selectable mode;
    receiving a signal indicative of at least one of the front wheel steering angle and the rear wheel steering angle;
    determining a rear-to-front steering-angle ratio in correspondence with at least one of the recognized mode and the received signal; and
    a rear-to-front steering ratio function for receiving at least one of a signal indicative of a driver-selected mode, a signal indicative of a vehicle speed, a signal indicative of a hand-wheel position, and a signal indicative of a selected gear, and providing a signal indicative of a rear-to-front steering angle ratio.

11. A method for controlling a four-wheel steering system of a vehicle, the method comprising:
    recognizing a driver-selectable mode;
    receiving a signal indicative of at least one of the front wheel steering angle and the rear wheel steering angle;
    determining a rear-to-front steering-angle ratio in correspondence with at least one of the recognized mode and the received signal; and
    a diagnostics function for receiving at least one diagnostic signal from the four-wheel steering system, and providing at least one of a signal indicative of vehicle recorder data, a signal indicative of a storable fault code, and a signal indicative of a class of fault.

12. A method for controlling a four-wheel steering system of a vehicle, the method comprising:
    recognizing a driver-selectable mode;
    receiving a signal indicative of at least one of the front wheel steering angle and the rear wheel steering angle;
    determining a rear-to-front steering-angle ratio in correspondence with at least one of the recognized mode and the received signal;
    extracting data from a bus; and
    entering a system state in correspondence with said extracted data, wherein the entered system state is a state selected from the group comprising initialize, run disable, output disable, shutdown, run, zero rear-wheel-angle, and off states.

13. A storage medium comprising:
    said storage medium encoded with a machine readable computer program code;
    said code including instructions for causing a computer to implement a method for controlling a four-wheel steering system of a vehicle, the method comprising:
    recognizing a driver-selectable mode corresponding to one of a standard four-wheel steering mode and a trailer-towing four-wheel steering mode;

receiving a signal indicative of at least one of the front wheel steering angle and the rear wheel steering angle; and determining a rear-to-front steering-angle ratio in correspondence with at least one of the recognized mode and the received signal.

14. A computer data signal comprising:

said computer data signal comprising code configured to cause a processor to implement a method for controlling a four-wheel steering system of a vehicle, the method comprising:

recognizing a driver-selectable mode corresponding to one of a standard four-wheel steering mode and a trailer-towing four-wheel steering mode;

receiving a signal indicative of at least one of the front wheel steering angle and the rear wheel steering angle; and determining a rear-to-front steering-angle ratio in correspondence with at least one of the recognized mode and the received signal.

15. A vehicular four-wheel steering system comprising:

an actuator in operable communication with a pair of rear wheels through a pair of tie rods, said actuator comprising:

a steering rack linked to said pair of tie rods; and an electric motor having an output shaft meshingly engaged with said steering rack; and a controller comprising:

means for recognizing a driver-selectable mode corresponding to one of a standard four-wheel steering mode and trailer-towing four-wheel steering mode;

means for receiving a signal indicative of at least one of the front wheel steering angle and the rear wheel steering angle; and means for determining a rear-to-front steering-angle ratio in correspondence with at least one of the recognized mode and the received signal.

16. A controller for providing a four-wheel steering algorithm for a vehicle, the controller comprising:

means for recognizing a driver-selectable mode corresponding to one of a standard four-wheel steering mode and a trailer-towing four-wheel steering mode;

means for receiving a signal indicative of at least one of the front wheel steering angle and the rear wheel steering angle; and means for determining a rear-to-front steering-angle ratio in correspondence with at least one of the recognized mode and the received signal.

* * * * *